July 22, 1969   A. TOPOUZIAN   3,456,518
ROTARY FRICTION DRIVE MECHANISM
Filed Feb. 2, 1967   2 Sheets-Sheet 1
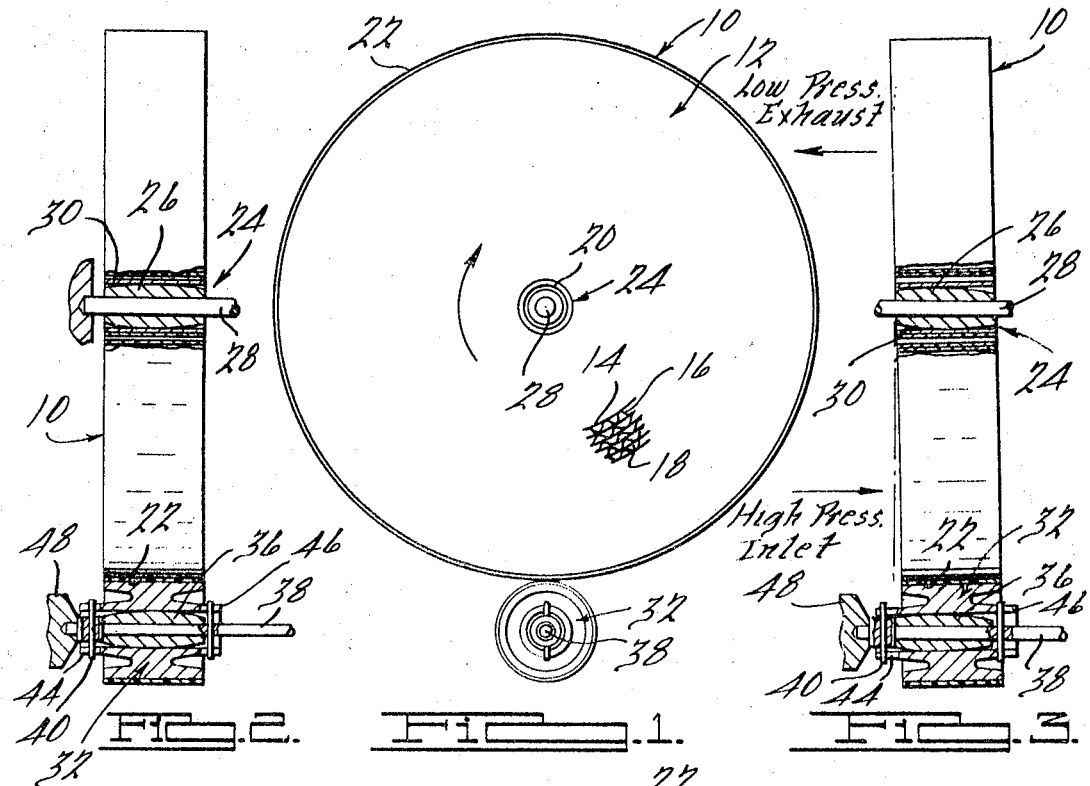
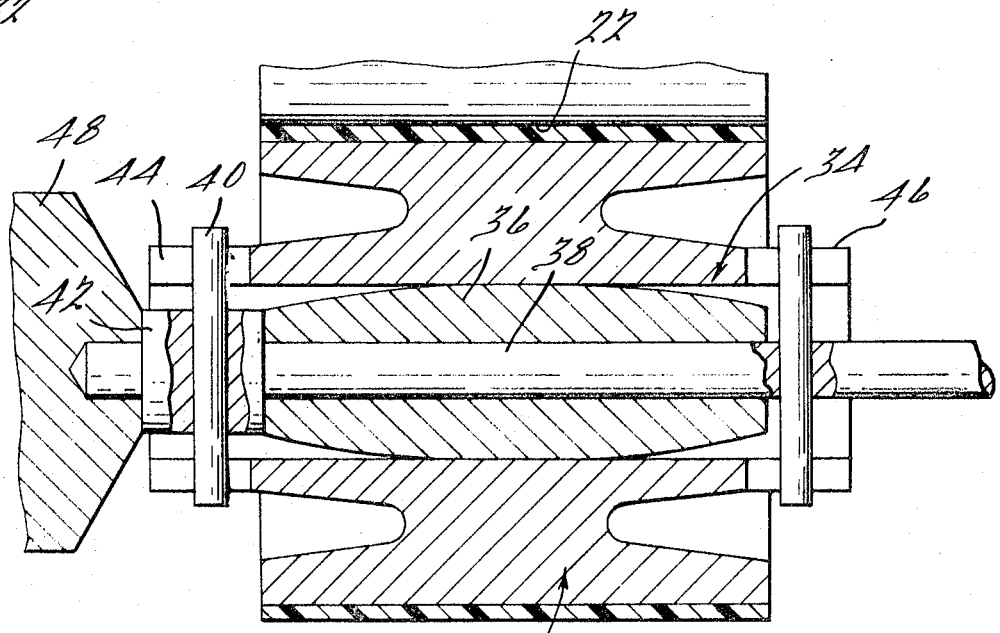
INVENTOR.
Armen Topouzian
BY John R. Faulkner
Robert E. McCollum
ATTORNEYS.

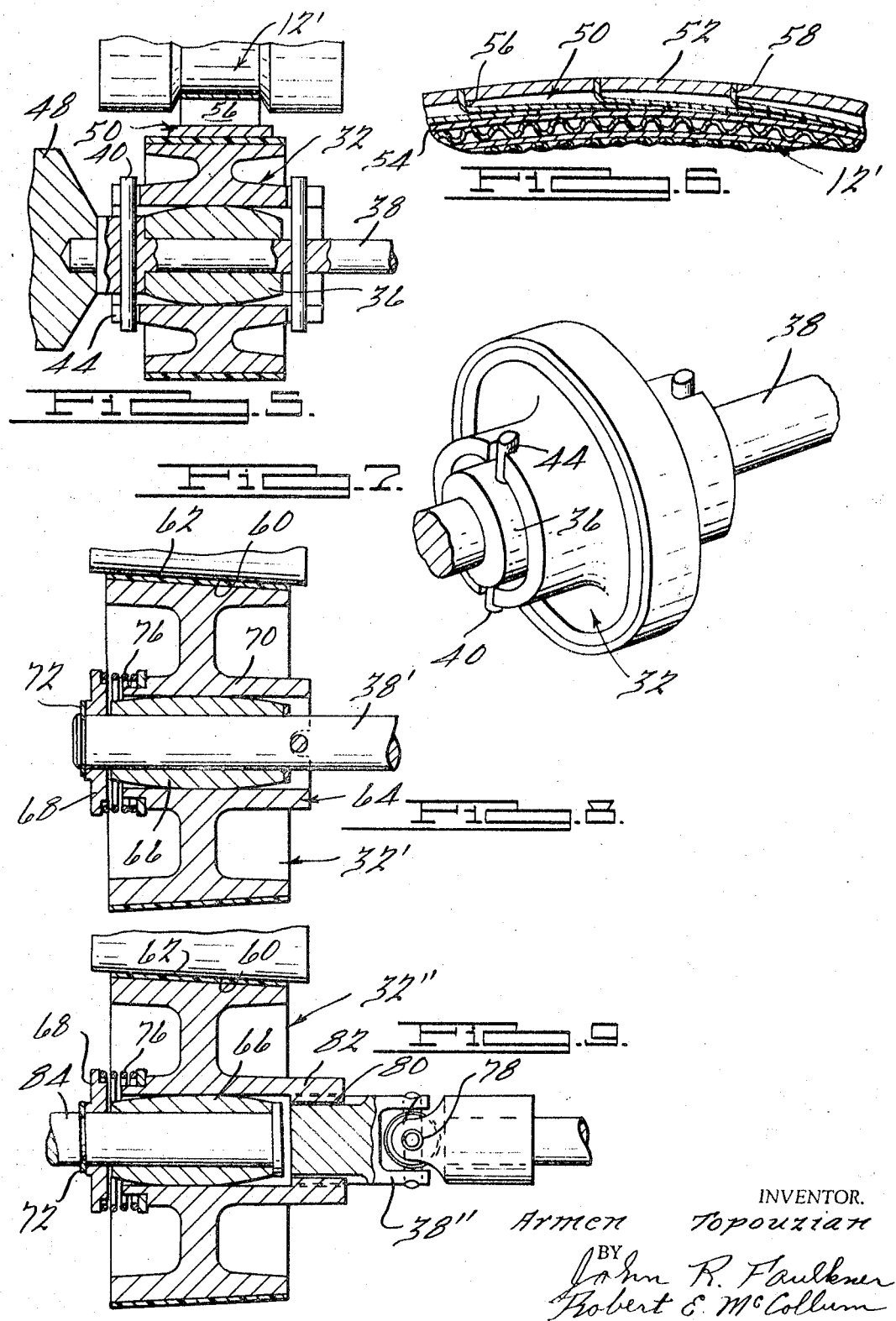

United States Patent Office 3,456,518
Patented July 22, 1969

3,456,518
ROTARY FRICTION DRIVE MECHANISM
Armen Topouzian, Detroit, Mich., assignor to Ford Motor Company, Dearborn, Mich., a corporation of Delaware
Filed Feb. 2, 1967, Ser. No. 613,606
Int. Cl. F16h *13/10, 57/00*
U.S. Cl. 74—207                                        8 Claims

ABSTRACT OF THE DISCLOSURE

A drive pinion roller frictionally drives a tiltable axis rotary regenerator, the drive pinion also having a tiltable axis of rotation and being axially slidable to conform to the tilting of the regenerator matrix to maintian maximum drive contact between the matrix and drive pinion contact surfaces.

---

This invention relates, in general, to a drive assembly for a rotatable member. More particularly, it relates to a mechanism for the peripheral drive of a rotary disc type heat exchanger that has a tiltable axis of rotation.

In my copending application Ser. No. 591,783, now Patent No. 3,392,776, I describe a rotary regenerator center bearing support that permits tilting or cocking of the regenerator matrix in response to differential gas pressure forces acting on it. This invention relates to a drive assembly for rotating tiltable matrices of the type shown and described in Ser. No. 591,783, the drive assembly having portions movable to compensate for the tilting of the matrix to thereby assure maximum drive contact with the matrix at all times.

Therefore, it is an object of the invention to provide a rotary member driving assembly including a friction drive element that has a tiltable axis of rotation for co-operation with a rotatable driven member that also has a tiltable axis of rotation.

It is a further object of the invention to provide a drive assembly of the type described above in which the friction drive element is axially slidable in operation to maintain maximum contact with the periphery of the driven member regardless of the tilting action of the latter member.

It is also an object of the invention to provide a mechanism to effect the peripheral friction drive of a rotary regenerator matrix, in which the two friction contacting surfaces have mating tapers that, when rotated, establish side thrust reaction forces that counterbalance the differential gas pressure forces normally acting on the matrix.

Another object of the invention is to provide a rotary member drive mechanism that consists of a rotary friction roller element having a tiltable axis of rotation, a tapered peripheral drive surface frictionally engaging the peripheral surface of the matrix to be driven, and a two-piece hub having one portion axially slidable with respect to the other and normally spaced from it by spring means that loads or wedges the tapering surfaces into driving engagement.

Other objects, features and advantages of the invention will become apparent upon reference to the succeeding detailed description thereof, and to the drawings illustrating the preferred embodiments thereof, wherein:

FIGURE 1 is a side elevational view of a rotary regenerator and a drive assembly that embodies the invention;

FIGURES 2 and 3 are end elevational views, with parts broken away and in section, of the assembly of FIGURE 1 illustrating the assembly in different operative positions;

FIGURE 4 is an enlarged view of the drive assembly illustrated in FIGURE 2;

FIGURE 5 is a view similar to FIGURE 4 and illustrating a modified drive assembly;

FIGURE 6 is a partial side elevational view of the FIGURE 5 showing;

FIGURE 7 illustrates, isometrically, the drive pinion shown in FIGURES 4 and 5; and FIGURES 8 and 9 are views corresponding to FIGURES 4 and 5 illustrating further embodiments of the invention.

FIGURE 1 shows a rotary regenerator heat exchanger 10 of the axial flow type. It has a matrix 12 which, in this case, is constructed by spirally winding a sandwich of two thin narrow strips 14 and 16 of sheet metal, for example, to the desired diameter, and then brazing the assembly. Strip 14 is flat and strip 16 circumferentially corrugated, to form a multiplicity of contiguous axially extending fluid passages 18 open at both ends.

The matrix 12 is confined between a sleeve hub 20 and an outer rim 22, the outer peripheral surface of the rim constituting a friction drive surface, for a purpose to be described. If the matrix is constructed of ceramic, for example, if would have an essentially rimless outer surface consisting of a thin coat of cement forming the outer wall of the radially outermost passages 18, and binding the matrix together.

As best seen in FIGURE 2, the matrix has a center support 24 that consists of an axially extending, essentially barrel-shaped baring means 26 that has a press fit within hub 20 and is non-rotatably secured on a stationary shaft 28. The outer arcuate surface 30 of bearing means 26 provides essentially a single diametral line or point contact (as seen in cross section) with the essentially straight inner annular surface of sleeve hub 20. This permits the axis of rotation of matrix 12 to swivel or tilt about the axis of bearing member 26 and shaft 28.

Further details of construction and operation of matrix 12 per se are not given since they are fully shown and described in the above mentioned Ser. No. 591, 783, and are believed to be unnecessary for an understanding of the invention. Suffice it to say that FIGURE 2 shows the regenerator in the position it attains when it is stationary and the gas turbine engine with which it is associated is inoperative.

As described in Ser. No. 591,783, the regenerator normally would be located between the compressor and combustion sections of a gas turbine engine. Suitable ducting would be connected to diametrically opposite face portions (FIGURE 3) to direct the flow of low pressure turbine exhaust gases through, say, the upper half portion of the regenerator axial flow passages 18 in one direction, while directing cooler high pressure compressor discharge air through the lower half portion passages in the opposite direction.

When the gas turbine is in operation, driving or rotating the rotary regenerator, in a manner to be described, effects first a transfer of the heat from the exhaust gases to the axial flow passage walls as the matrix rotates through one half cycle, and then the retransfer of this heat to the cooler compressor discharge air as it passes through the same passages during rotation of the matrix through the remaining half cycle, in a known manner.

The existence of the low pressure gases acting on the right hand upper face of matrix 12, and the high pressure compressor air acting on the lower left hand face applies a force moment effecting the counterclockwise tilting of the axis of rotation of the matrix about the barrel-like center support 24.

The mechanism for driving the rim 22 of matrix 12 is constructed to maintain maximum surface contact between the driving member and the matrix at all times regardless of the tilting or nontilting of the matrix. More specifically, as best seen in FIGURE 4, the peripheral surface 22 of matrix 12 is frictionally engaged by the outer surface of a roller drive element 32. The roller element is tiltably and nonrotatably mounted on a barrel-like center support 34. The center support consists of an essentially barrel-shaped bearing member 36 fixedly secured to a rotating drive shaft extension 38.

As best seen in FIGURES 4 and 7, drive pinion 32 is rotated by shaft 38 through a pair of pins 40. The pins are fixed in an extension 42 of barrel member 36 and shaft 38 at one end, and in shaft 38 at the other end, and project radially through aligned slots 44 provided in axial extensions 46 of drive pinion 32. The slots permit axial sliding movement of drive pinion 32 with respect to center support 34 as well as a tilting movement of the axis of rotation of the drive pinion with respect to the shaft axis. The left hand end of shaft 38 has a press fit within the end of a suitable drive member 48.

Incident to assembly, drive pinion 32 would be preloaded against the matrix 12 to assure sufficient frictional force to drive the matrix. The preload would be taken on, say, a high temperature silicon coating molded or sprayed on the roller, for example, to provide the high rolling friction coefficient necessary to drive the matrix.

From a consideration of FIGURES 2 and 3, it will be clear that when matrix 12 tilts from the position shown in FIGURE 2 to that shown in FIGURE 3, due to the gas pressure differential acting on opposite faces of the matrix, the drive pinion will move axially and simultaneously tilt its axis of rotation from the position shown in FIGURE 2 to that in FIGURE 3. The slots 44 cooperate at this time with pins 40 to permit this action.

FIGURES 5, 6 and 7 show an indirect drive arrangement for a matrix section that is constructed of ceramic material, for example, where the point loading of the pinion roller of FIGURES 1 through 4 may be excessive. In such a case, as seen in FIGURE 6, the matrix 12' would be surrounded by a metal ring 50 that is connected to the outer edge of matrix 12' by a plurality of circumferentially spaced and overlapping leaf-like spring members 56. Each of the spring members has a flanged end portion 58 engaged in a slot or against a lateral projection of ring 52. The spring members would be initially compressed or preloaded toward the matrix for assembly of the ring 52 to the matrix. This not only maintains the ring 50 resiliently spaced from the matrix outer edge, but provides the necessary frictional drive engagement of the ends of the spring members against the matrix. It will be seen that the metallic ring distributes the load along the periphery of the matrix.

The drive pinion or pulley member 32', in this instance, has a construction essentially the same as that shown and described in connection with the FIGURES 4 and 7 constructions.

FIGURE 8 illustrates a modified drive pinion construction. In this case, the outer surfaces 60 and 62 of both the matrix and drive roller pinion are tapered, as shown, and the roller contact surface again would be of a material or coated with a material that would provide sufficient rolling friction to drive the matrix. The hub 64 of the drive pinion 32' again is tiltably mounted upon a barrel-like center support 66, and consists of two portions 68 and 70. Portion 68 is axially fixed in one direction against the drive shaft 38' by a snap ring 72. Portion 70 has a pin drive connection 74 to the drive shaft in a manner shown, and is axially slidably mounted upon the center barrel-like support 66. The two hub portions 68 and 70 are axially separated by a compression spring 76 that urges the two tapering surfaces 60 and 62 into driving engagement.

It will be clear that rotation of the drive pinion roller will apply a driving force perpendicular to the tapered surfaces, and that the reaction force from the matrix will be of equal force and in the opposite direction. This reaction force can be resolved into horizontal and vertical components, the horizontal force opposing the spring and gas load forces and effecting positive contact between the roller and matrix over a large surface.

FIGURE 9 shows a modification of the FIGURE 8 embodiment, in which greater freedom of movement is provided by the addition of a universal joint 78 between portions of the drive shaft, and a splined connection 80 between the shaft 38" and the hub 82 of the drive roller pinion 32". The center support shaft 84 in this case could be stationary.

From the foregoing, it will be seen that the invention provides a low cost drive mechanism for a rotary regenerator due to the fact that the conventional metallic ring and pinion gears normally used to drive rotary regenerators are eliminated. It will also be seen that the center barrel mounts of the rotary members provide maximum contact between the matrix periphery and the drive pinion under all engine operating conditions. It will further be seen that the spring mounted meallic ring construction illustrated in FIGURES 5 and 6 permits a friction drive of a matrix of fragile, brittle materials that cannot withstand excessive point loadings, and that such a ring eliminates the need for a thick ceramic rim. It will also be seen that the spring mounted metallic ring could be used on a metal matrix, since the floating mount of the ring would permit thermal expansion of the matrix.

I claim:

1. A peripheral drive mechanism for an annular rotatable member having a tiltable axis of rotation, comprising a rotating drive shaft, rotatable means operably secured to and mounted on said shaft for rotation therewith and drivably engaging the periphery of said member for rotation thereof, and further means mounting said rotatable means on said drive shaft for tilting movement of the axis of rotation of said rotatable means in response to tilting of the axis of rotation of said annular member, said rotatable means comprising a tiltable roller element having a frictional driving engagement with the periphery of said member, and additional means between said rotatable means and said shaft mounting said rotatable means for an axial sliding movement at times with respect to said shaft in response to tilting tendency of the axis of rotation of said rotatable member.

2. A drive mechanism as in claim 1, said rotatable means including first and second axially spaced portions fixedly and axially slidably secured, respectively, to said drive shaft, said additional means including spring means between said portions biasing said portions apart, said second portion being slidable axially towards said first portion in response to tilting tendency of said member in one direction.

3. A drive mechanism comprising in combination, a first shaft and a rotatable drive shaft, first and second rotatable cylindrical members, and means mounting said first and second cylindrical members on said first and drive shafts, respectively, each for a rotation about the axis of the shaft with which it is associated and for a tilting movement of its axis of rotation, and means frictionally engaging said members for a drive of said first member upon rotation of said second member, said members each having sleeve-like hubs, and bearing means secured to each of said shafts and each having a barrel-like peripheral surface engaging a portion of the inner periphery of the associated hub, and means mounting the hub of said second member for an axial sliding movement relative to said drive shaft in response to tilting tendencies of said members.

4. A disc drive assembly comprising in combination, a shaft, a rotatable disc surrounding said shaft, bearing means between said shaft and disc mounting said disc for rotation on said shaft, said bearing means having a barrel-like outer peripheral surface slidably engaging a portion of the bore of said disc mounting said disc for a tilting movement of the axis of rotation of said disc, a friction drive roller element frictionally engaging the outer periphery of said disc for a rotatable drive of said disc, a rotating drive shaft surrounded by said roller element and secured thereto, and bearing means between said drive shaft and said roller element, said bearing means being non-rotatably secured to said drive shaft and having a barrel-like outer peripheral surface engaging a portion of said roller element mounting said element for a tilting movement of its axis of rotation in response to tilting tendencies of said disc.

5. A drive mechanism as in claim 4, including means mounting said roller element for an axial sliding movement relative to said drive shaft bearing means concurrent with a tilting movement of said roller element.

6. A drive mechanism as in claim 4, the frictional engaging surfaces between said element and member being matingly inclined with respect to the direction of extension of the axis of rotation of said shafts to resist tilting movement of said disc and element.

7. A drive mechanism as in claim 6, including means mounting said roller element for an axial sliding movement relative to said drive shaft concurrent with a tilting tendency of said roller element.

8. A drive mechanism as in claim 7, including spring means biasing said element to one axial position, said element being slidably movable to another axial position against the force of said spring means upon tilting of said element, said spring means wedging said inclined surfaces together to resist tilting movement of said disc and element.

References Cited

UNITED STATES PATENTS

| | | | |
|---|---|---|---|
| 641,940 | 1/1900 | Dana | 64—22 |
| 1,097,261 | 5/1914 | Platt | 64—22 |
| 1,496,120 | 6/1924 | Hilger | 74—206 |
| 2,157,852 | 5/1939 | Grosser | 64—22 |
| 2,570,082 | 10/1951 | Traylor | 74—206 |
| 3,177,735 | 4/1965 | Chute | 165—8 |
| 3,300,967 | 1/1967 | Trapp | 165—8 |
| 2,281,875 | 5/1942 | Gleissner | 308—72 XR |
| 2,749,778 | 6/1956 | Kuhn | 74—411 XR |

FRED C. MATTERN, JR., Primary Examiner

J. A. WONG, Assistant Examiner

U.S. Cl. X.R.

64—22; 74—208, 410, 411; 165—8; 308—72